US012276739B2

(12) United States Patent
Chen et al.

(10) Patent No.: US 12,276,739 B2
(45) Date of Patent: Apr. 15, 2025

(54) VEHICLE-MOUNTED CONTROLLER AND METHOD FOR ISSUING ABSOLUTE TIME OF VEHICLE AND VEHICLE (71) Applicant: Xiaomi EV Technology Co., Ltd., Beijing (CN)

(72) Inventors: Hao Chen, Beijing (CN); Yikui Dong, Beijing (CN); Daqian Deng, Beijing (CN)

(73) Assignee: XIAOMI EV TECHNOLOGY CO. LTD., Beijing (CN)

(*) Notice: Subject to any disclaimer, the term of this patent is extended or adjusted under 35 U.S.C. 154(b) by 385 days.

(21) Appl. No.: 17/974,854

(22) Filed: Oct. 27, 2022

(65) Prior Publication Data
US 2024/0069217 A1 Feb. 29, 2024

(30) Foreign Application Priority Data
Aug. 23, 2022 (CN) .......................... 202211014653.6

(51) Int. Cl.
G01S 19/51 (2010.01)
H04L 12/40 (2006.01)

(52) U.S. Cl.
CPC .............. *G01S 19/51* (2013.01); *H04L 12/40* (2013.01); *H04L 2012/40215* (2013.01); *H04L 2012/40273* (2013.01)

(58) Field of Classification Search
CPC ........ G01S 19/42; G01S 19/51; H04W 56/00; H04L 43/106; H04L 27/2613; H04L 12/40; H04L 2012/40215; H04L 2012/40273
See application file for complete search history.

(56) References Cited

U.S. PATENT DOCUMENTS 11,604,286 B2 * 3/2023 Srivastava .............. G01S 19/39
2008/0129591 A1 6/2008 Lamance et al.
(Continued)

FOREIGN PATENT DOCUMENTS

CA 2716293 A1 * 12/2009 ............. G01S 19/12
CN 101513983 A 8/2009
(Continued)

OTHER PUBLICATIONS

Chinese Office Action issued on Sep. 28, 2022 for Chinese Patent Application No. 202211014653.6.
(Continued)

*Primary Examiner* — Dung Hong
(74) *Attorney, Agent, or Firm* — Volpe Koenig (57) ABSTRACT A vehicle-mounted controller includes: a GNSS module, an MPU and an MCU. The GNSS module transmits a pulse signal to the MPU via the rigid line and transmits recommended positioning information to the MPU via the serial port line at the moment when a change occurs in high and low levels of the pulse signal; the MPU determines first absolute time according to first reception time when the pulse signal is received, second reception time when the recommended positioning information is received, and the recommended positioning information, and broadcasts the first absolute time to Ethernet network for absolute time synchronization; the MCU determines second absolute time according to time when the pulse signal is received, time when the first absolute time is received, and the recommended positioning information, and broadcasts the second absolute time to a CAN bus for absolute time synchronization.

19 Claims, 5 Drawing Sheets (56) References Cited

U.S. PATENT DOCUMENTS

| | | | | |
|---|---|---|---|---|
| 2011/0163915 A1* | 7/2011 | Huang | ................... | G01S 19/23 |
| | | | | 342/357.49 |
| 2019/0069052 A1* | 2/2019 | Al-Stouhi | ............... | H04W 4/46 |
| 2022/0278745 A1* | 9/2022 | Qu | ....................... | H04J 3/0641 |
| 2022/0329335 A1* | 10/2022 | Zhang | .................. | H04J 3/0644 |

FOREIGN PATENT DOCUMENTS

| | | | | | |
|---|---|---|---|---|---|
| CN | 101855842 | A | | 10/2010 | |
| CN | 108282242 | A * | | 7/2018 | ............ H04J 3/0638 |
| CN | 112629530 | A | | 4/2021 | |
| CN | 113110160 | A | | 7/2021 | |
| CN | 113422665 | A | | 9/2021 | |
| CN | 114415489 | A | | 4/2022 | |
| EP | 4044467 | A1 | | 8/2022 | |
| JP | 2021-027408 | A | | 2/2021 | |
| WO | WO-2010075647 | A1 * | | 7/2010 | ............ G01S 19/23 |
| WO | 2021/054067 | A1 | | 3/2021 | |
| WO | 2022/088080 | A1 | | 5/2022 | |

OTHER PUBLICATIONS

Extended European Search Report issued on Aug. 17, 2023 for European Patent Application No. 22204668.2.

* cited by examiner

| Signal name | Signal description | Signal length (bit) | Data type | Accuracy | Offset | Physical minimum | Physical maximum |
|---|---|---|---|---|---|---|---|
| TDomn | time domain | 8 | Unsigned | 1 | 0 | 0 | 24 |
| DateTiYr | date time year | 8 | Unsigned | 1 | 2000 | 2000 | 2254 |
| DateTiMth | date time month | 4 | Unsigned | 1 | 0 | 0 | 12 |
| DateTiDay | date time day | 5 | Unsigned | 1 | 0 | 1 | 31 |
| DateTiHr | date time hour | 5 | Unsigned | 1 | 0 | 0 | 23 |
| DateTiMns | date time minute | 8 | Unsigned | 1 | 0 | 0 | 59 |
| DateTiSec | date time second | 8 | Unsigned | 1 | 0 | 0 | 59 |
| DateTiMsec | date time millisecond | 10 | Unsigned | 1 | 0 | 1 | 1023 |

FIG. 4

A GNSS module transmits a pulse signal to an MPU via a rigid line, and transmits recommended positioning information to the MPU via a serial port line at a moment when a change occurs in high and low levels of the pulse signal — S51

The MPU determines first absolute time according to first reception time when the pulse signal is received, second reception time when the recommended positioning information is received, and the recommended positioning information, and broadcasts the first absolute time to an Ethernet network for absolute time synchronization of a vehicle-mounted device connected to the Ethernet network — S52

An MCU determines second absolute time according to third reception time when the pulse signal is received, fourth reception time when the first absolute time is received, and the recommended positioning information, and broadcasts the second absolute time to a CAN bus for absolute time synchronization of a vehicle-mounted device connected to the CAN bus — S53

VEHICLE-MOUNTED CONTROLLER AND METHOD FOR ISSUING ABSOLUTE TIME OF VEHICLE AND VEHICLE

CROSS REFERENCE TO RELATED APPLICATION

The present application claims the benefit of priority to Chinese Application No. 202211014653.6, filed on Aug. 23, 2022, the contents of which are incorporated herein by reference in their entireties for all purposes.

BACKGROUND

A vehicle configured with an autonomous function is generally equipped with sensors such as a camera, a millimeter wave radar, an ultrasonic radar, and a LiDAR. Absolute time synchronization is performed on the time of the respective sensors, thus improving the accuracy of integration of sensor information of the entire vehicle.

SUMMARY

The disclosure relates to the technical field of vehicle time synchronization, in particular to a vehicle-mounted controller and a method for issuing absolute time of a vehicle and a vehicle.

According to a first aspect of an example of the disclosure, a vehicle-mounted controller for issuing absolute time of a vehicle is provided, and includes:
- a GNSS (Global Navigation Satellite System) module, an MPU (Micro-processor Unit) connected to the GNSS module via a first rigid line and a first serial port line, and an MCU (Micro-controller Unit) connected to the MPU via a second rigid line and a second serial port line;
- the GNSS module is configured to: transmit a pulse signal to the MPU via the rigid line and transmit recommended positioning information to the MPU via the serial port line at a moment when a change occurs in high and low levels of the pulse signal;
- the MPU is configured to: determine first absolute time according to first reception time when the pulse signal is received, second reception time when the recommended positioning information is received, and the recommended positioning information, and broadcast the first absolute time to an Ethernet network for absolute time synchronization of a first vehicle-mounted device connected to the Ethernet network;
- the MCU is configured to: determine second absolute time according to third reception time when the pulse signal is received, fourth reception time when the first absolute time is received, and the recommended positioning information, and broadcast the second absolute time to a CAN (Controller Area Network) bus for absolute time synchronization of a second vehicle-mounted device connected to the CAN bus.

According to a second aspect of an example of the disclosure, a method for issuing absolute time of a vehicle is provided, and is applied to the vehicle-mounted controller for issuing the absolute time of the vehicle in the first aspect; the method includes:
- transmitting, by the GNSS module, a pulse signal to the MPU via a first rigid line, and transmitting the recommended positioning information to the MPU via a first serial port line at a moment when a change occurs in high and low levels of the pulse signal;
- determining, by the MPU, first absolute time according to first reception time when the pulse signal is received, second reception time when the recommended positioning information is received, and the recommended positioning information, and broadcasting the first absolute time to an Ethernet network for absolute time synchronization of a first vehicle-mounted device connected to the Ethernet network; and
- determining, by the MCU, second absolute time according to third reception time when the pulse signal is received, fourth reception time when the first absolute time is received, and the recommended positioning information, and broadcasting the second absolute time to a CAN bus for absolute time synchronization of a second vehicle-mounted device connected to the CAN bus.

According to a third aspect of an example of the disclosure, a vehicle including the vehicle-mounted controller for issuing the absolute time of the vehicle in the first aspect.

BRIEF DESCRIPTION OF THE DRAWINGS

The accompanying drawings here are incorporated in and constitute a part of the description, illustrate examples consistent with the disclosure and, together with the description, serve to explain the principles of the disclosure.

DETAILED DESCRIPTION

Examples are described in detail here, and instances are illustrated in the accompanying drawings. When the following description refers to the accompanying drawings, the same numerals in different drawings indicate the same or similar elements unless otherwise indicated. The implementations described in the following examples do not represent all implementations consistent with the disclosure. On the contrary, the implementations are examples of apparatuses and methods consistent with some aspects of the disclosure as detailed in the appended claims.

A vehicle configured with an autonomous function is generally equipped with sensors such as a camera, a millimeter wave radar, an ultrasonic radar, and a LiDAR. Absolute time synchronization is performed on the time of the respective sensors, thus improving the accuracy of the integration of sensor information of the entire vehicle. An MPU (Micro-processor Unit) in a central processing unit (CPU) acquires RTC (Real-TimeClock) time and UTC (Universal Time Coordinated), broadcasts the RTC time to each Ethernet node of the vehicle, calculates a time difference between the UTC and the RTC time and transmits the time difference to each Ethernet node which performs absolute time synchronization by adding the time difference to the RTC time.

However, both the RTC time and the time difference between the UTC and the RTC time need to be transmitted over the network, but the transmission time is uncontrollable, which may result in low absolute time synchronization accuracy; and each Ethernet node needs to calculate the absolute time synchronization, occupying the resources of each Ethernet node.

To overcome the problems present in the related art, the disclosure provides a vehicle-mounted controller and a method for issuing absolute time of a vehicle, and a vehicle.

Figure 1:
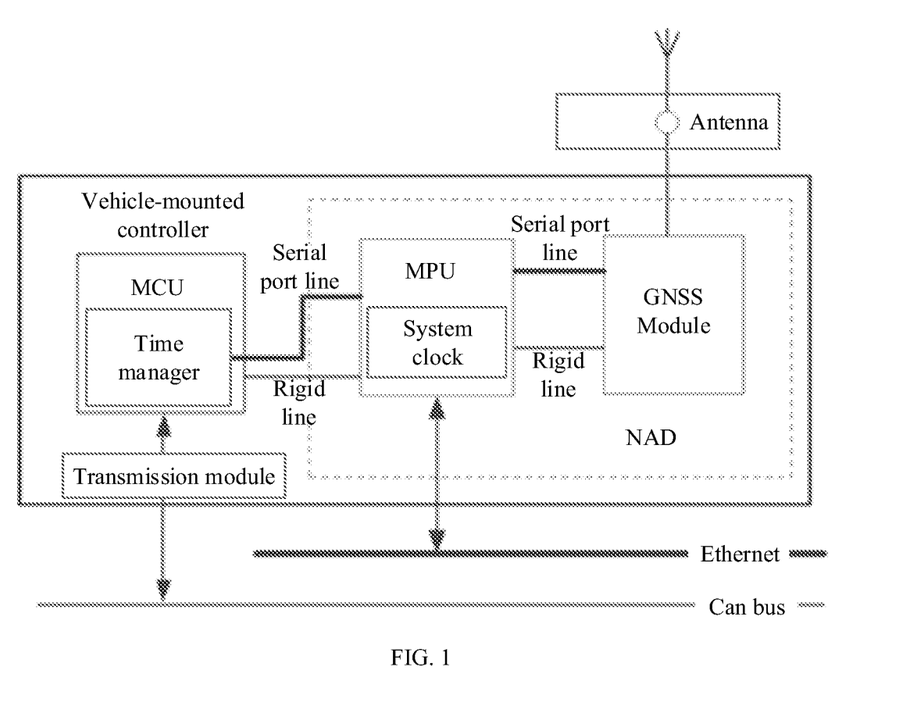
FIG. 1 is a block diagram illustrating a vehicle-mounted controller for issuing absolute time of a vehicle according to an example.

FIG. 1 is a block diagram illustrating a vehicle-mounted controller for issuing absolute time of a vehicle according to an example. The vehicle-mounted controller of the disclosure may be an internet-of-vehicle system T-BOX. As shown in FIG. 1, the vehicle-mounted controller includes:

a GNSS module, an MPU Unit connected to the GNSS module via a rigid line and a serial port line, and an MCU connected to the MPU via a rigid line and a serial port line.

The GNSS module and the MPU may be disposed of in a NAD (network access device) of the vehicle-mounted controller, while the MCU is not disposed of in the NAD. The MCU is connected to a CAN bus by a CAN transceiver, and the MPU is connected to the Ethernet network by a port physical layer.

It may be noted that the rigid line is a common vehicle-mounted copper core wire harness that can transmit voltage signals, cannot carry information, is high in transmission speed, and almost has no delay. Whereas the serial port line may be, for example, an SPI (Serial Peripheral Interface) bus, and the serial port line may carry a large amount of information, is in transmission speed, and has a delay. Furthermore, the transmission speed is limited by a baud rate of the serial port line and a data size.

The GNSS module is configured to: transmit a pulse signal to the MPU via the rigid line and transmit recommended positioning information to the MPU via the serial port line at the moment when a change occurs in high and low levels of the pulse signal.

Figure 2:
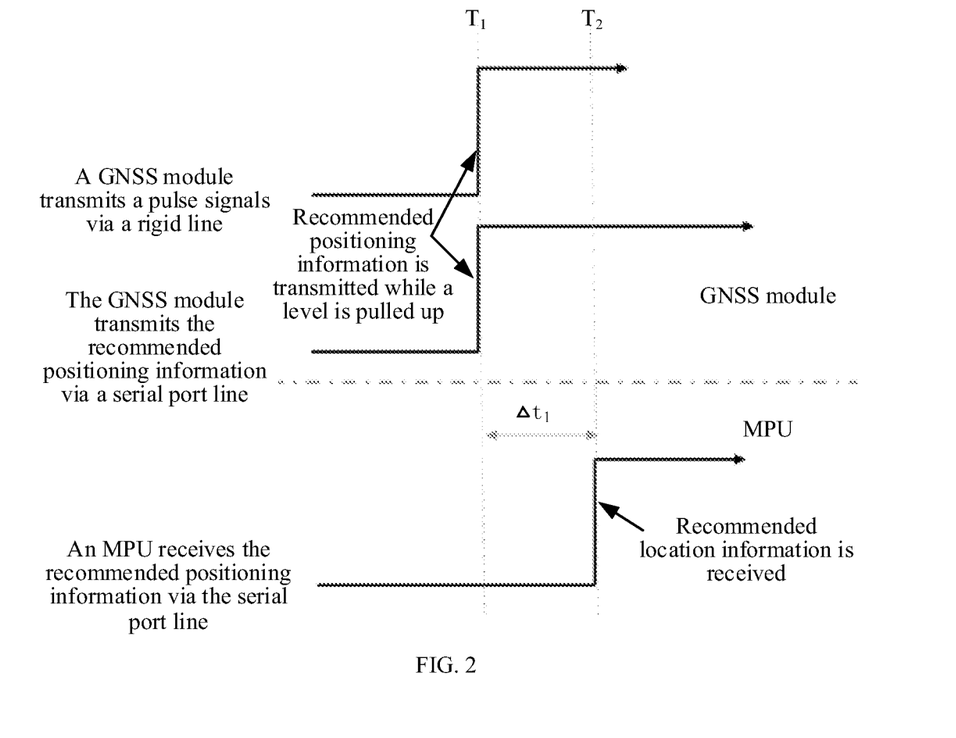
FIG. 2 is a schematic diagram illustrating transmission of a pulse signal and recommended positioning information by a GNSS module according to an example.

The moment when a change occurs in high and low levels of the pulse signal may refer to the moment when the level of the pulse signal is pulled up, or referring to FIG. 2, may be the moment when the level of the pulse signal is pulled down.

With continued reference to FIG. 2, the GNSS module transmits the pulse signal to the MPU at the moment T1 via the rigid line, and the MPU can receive the pulse signal with the level pulled up at the moment T1 without delay. The recommended positioning information transmitted by the GNSS module to the MPU via the serial port line at the moment T1 is received at the moment T2 after a delay of $\Delta t1$.

The MPU is configured to: determine first absolute time according to first reception time when the pulse signal is received, second reception time when the recommended positioning information is received, and the recommended positioning information, and broadcast the first absolute time to the Ethernet network for absolute time synchronization of a vehicle-mounted device connected to the Ethernet network.

In an example of the disclosure, a system clock in the MPU determines the first absolute time according to the first reception time, the second reception time, and the recommended positioning information, for example, the first absolute time=UTC (Universal Time Coordinated) carried in the recommended positioning information+(T2−T1).

The UTC is parsed by the MPU via the following method:
obtaining the UTC by parsing the recommended positioning information; and
obtaining the first absolute time according to the first reception time, the second reception time, and the UTC.

It may be understood that the recommended positioning information is transmitted in the form of a message, and the message format may be as follows:

Field0: $GPRMC, ID format, indicating that the format is recommended minimum positioning information for recommended minimum specific GPS/TRANSIT data (RMC);
Field1: UTC time, hhmmss.ssss format, representing hour/minute/second/millisecond;
Field2: status, A representing positioning success, V representing positioning failure;
Field3: latitude: ddmm.mmmmmm format (filled with 0 if the leading digit is not sufficient);
Field4: latitude: N (north latitude) S (south latitude);
Field5: longitude: dddmm.mmmmmm format (filled with zeros if the leading digit is not sufficient);
Field6: longitude: E (east longitude) W (west longitude);
Field7: speed (1.852 km/h);
Field8: azimuth, degree (two-dimensional direction, equivalent to a two-dimensional compass);
Field9: UTC Date DDMMYY (day/month/year);
Field10: magnetic declination (000-180) degree (filled with 0 if the leading digit is not sufficient);
Field11: magnetic declination direction E=East, W=West;
Field12: mode, A=Auto, D=Differential, E=Estimated, AND=Invalid data (3.0 protocol content);
Field13: check and provide time information.

In the disclosure, the current UTC can be derived from Field1 and Field9: year, month, day, hour, minute, second, and millisecond.

Figure 3:
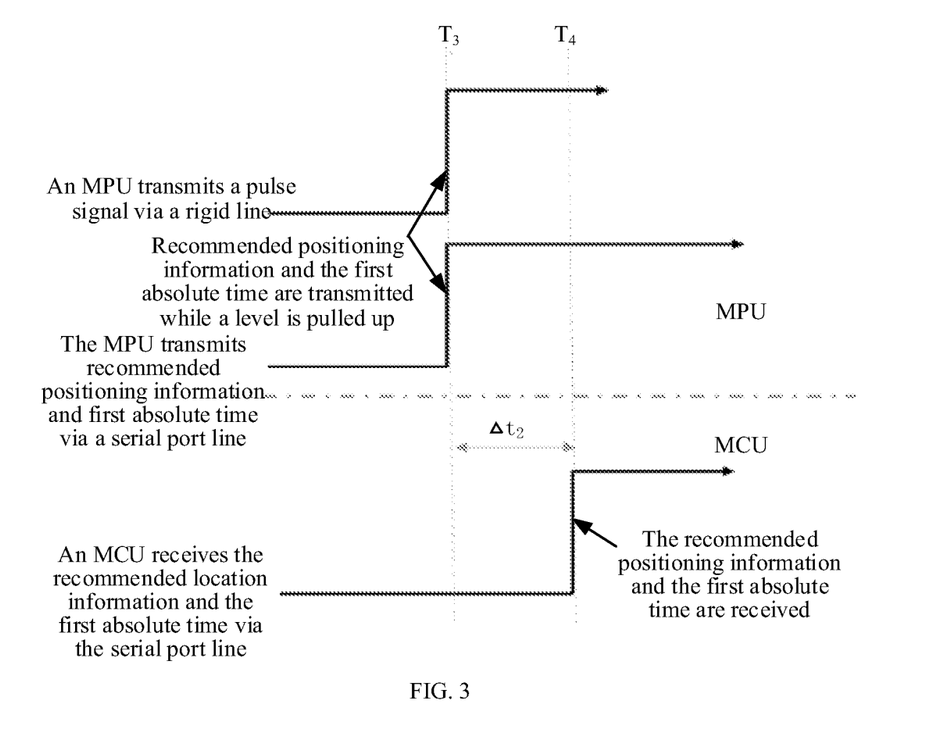
FIG. 3 is a schematic diagram illustrating transmission of a pulse signal and second absolute time by an MPU according to an example.

Referring to FIG. 3, the MPU transmits the pulse signal at a moment T3 to the MCU via the rigid line, and the MCU can receive the pulse signal with the level pulled up at the moment T3 without delay. The recommended positioning information and the first absolute time transmitted by the MPU to the MCU via the serial port line at the moment T3 is received at a moment T4 after a delay of $\Delta t2$.

It can be noted here that according to experiment results, the pulse signal is generally transmitted according to a period of 1PPS (1 Pulse Per Second), guaranteeing that the recommended positioning information or the first absolute time is received before a next signal with the same level is received.

By means of the experiment results, the baud rate of the serial port line and the data size of the recommended positioning information affect the size of $\Delta t1$ and $\Delta t2$, but the delay is not greater than 1 s, and the delay is around 50 ms. Thus, the pulse signal is transmitted according to the period of 1PPS, and the MPU and the MCU can receive the recommended positioning information or the first absolute time before the next level is pulled up.

The MCU is configured to: determine second absolute time according to third reception time when the pulse signal is received, fourth reception time when the first absolute time is received, and the recommended positioning information, and broadcast the second absolute time to a CAN bus for absolute time synchronization of a vehicle-mounted device connected to the CAN bus.

With continued reference to FIG. 3, a timer manager in the MCU determines the second absolute time according to the third reception time, the fourth reception time and the recommended positioning information, for example, the second absolute time=UTC carried in the recommended positioning information+(T4−T3).

In an example of the disclosure, if the GNSS module does not obtain the recommended positioning information in time via the antenna, a timer master of the MCU issues an initial absolute time with a period of 100 ms to the CAN bus by using consistent RTC time. After the GNSS module obtains the recommended positioning information by the antenna, the timer master of the MCU calculates the second absolute time in the manner mentioned in the above example and synchronizes the second absolute time to the CAN bus.

Figure 4:
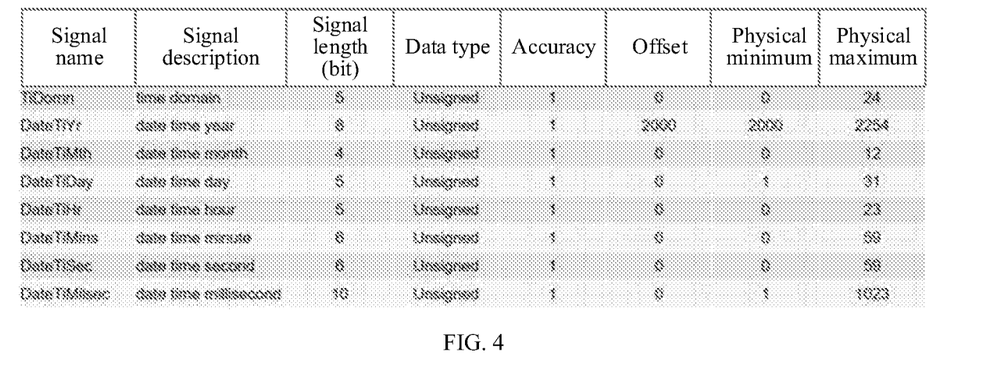
FIG. 4 is a schematic diagram illustrating a CAN message format according to an example.

In an example of the disclosure, the MCU broadcasts the second absolute time to the CAN bus in the form of a CAN message, referring to the CAN message format as shown in FIG. 4, which includes signal name, signal description, signal length (bit), data type, accuracy, offset, physical minimum and physical maximum.

In the above technical solution, the GNSS module transmits the pulse signal to the MPU via the rigid line and transmits the recommended positioning information to the MPU via the serial port line at the moment when a change occurs in the high and low levels of the pulse signal; the MPU determines the first absolute time according to the time when the pulse signal is received, the time when the recommended positioning information is received, and the recommended positioning information, and broadcasts the first absolute time to the Ethernet network for absolute time synchronization of the vehicle-mounted device connected to the Ethernet network; and the MCU determines the second absolute time according to the time when the pulse signal is received, the time when the first absolute time is received, and the recommended positioning information, and broadcasts the second absolute time to the CAN bus for absolute time synchronization of the vehicle-mounted device connected to the CAN bus. The absolute time is calculated on the MPU and the MCU uniformly so that neither Ethernet nodes nor nodes on the CAN bus need to perform absolute time calculation, thus avoiding occupying resources of the Ethernet nodes and the nodes on the CAN bus. In addition, absolute time synchronization is performed on the vehicle-mounted device on the Ethernet network and the vehicle-mounted device on the CAN bus by first level (the first absolute time pertains to first-level calculation) and second level (the second absolute time pertains to second-level calculation based on the first absolute time), respectively, thus improving the absolute time synchronization accuracy of the vehicle-mounted devices. Furthermore, by issuing absolute time via the MPU and the MCU, absolute time synchronization can be performed directly when a vehicle-mounted device is added, reducing the complexity and cost for vehicle development.

By means of the experiment results, according to the technical solution of the disclosure, the absolute time difference of the vehicle-mounted devices after the absolute time synchronization is around 2 ms, which is much less than 50 ms in the related art, thus improving the absolute time synchronization accuracy of the vehicle-mounted devices. Furthermore, SOA services and gPTP do not need to be set on the vehicle, reducing the vehicle cost.

In some examples, the MPU is configured to: record the first reception time when the pulse signal is received and forward the pulse signal to the MCU via the rigid line; record the second reception time when the recommended positioning information is received and determine the first absolute time according to the UTC carried in the recommended positioning information, the first reception time, and the second reception time; and transmit the recommended positioning information and the first absolute time to the MCU via the serial port line.

The MCU is configured to: record the third reception time when the pulse signal is received and the fourth reception time when the first absolute time is received, and determine the second absolute time according to the UTC carried in the recommended positioning information, the third reception time, and the fourth reception time.

In some examples, the GNSS module is configured to generate the pulse signal in the case that the recommended positioning information is obtained. A period of the pulse signal is determined by at least one of the baud rate of the serial port line configured for the vehicle, and the data size of the recommended positioning information.

In some examples, the GNSS module is configured to:
determine the data size of the recommended positioning information;
determine a predicted duration for the serial port line to transmit the recommended positioning information according to the data size and the baud rate of the serial port line; and
generate the pulse signal according to the predicted duration, the period of the pulse signal being greater than the predicted duration.

According to the above technical solution, the period of the pulse signal being greater than the predicted duration may ensure that the recommended positioning information or the first absolute time is received before the next signal with the same level is received, thus improving the calculation convenience.

In some examples, the MPU is configured to:
obtain device absolute time reported by a plurality of vehicle-mounted devices on the Ethernet network during travel of the vehicle; and
determine a maximum time difference in device absolute time corresponding to each of the vehicle-mounted devices.

In an example of the disclosure, the time difference in the device absolute time between the pairwise vehicle-mounted devices is calculated to determine the maximum time difference in the device absolute time corresponding to each of the vehicle-mounted devices.

Further, the two vehicle-mounted devices corresponding to the maximum time difference serve as target vehicle-mounted devices, the device absolute time may be preferentially obtained from the target vehicle-mounted devices when the maximum time difference is calculated subsequently.

The GNSS module is instructed to obtain the recommended positioning information from the network in the case that the maximum time difference is greater than a preset time difference threshold.

According to the above technical solution, in the case that the maximum time difference is greater than the preset time difference threshold, it indicates that there is a difference in the absolute time of the whole vehicle, and thus absolute time synchronization needs to be performed in time, thus avoiding non-synchronization of the absolute time of the whole vehicle.

In some examples, the MCU is configured to:
instruct the GNSS module to obtain the recommended positioning information from the network according to a preset synchronization period during the travel of the vehicle.

For example, the MCU is generally connected with the RTC of the vehicle and obtains clock timing by means of I2C. In the disclosure, autonomous vehicle timing is performed by the RTC, and in the case that the RTC timing reaches the preset synchronization period, the MCU instructs the GNSS module to obtain the recommended positioning information from the network.

According to the above technical solution, absolute time synchronization can be performed according to the preset synchronization period during travel, thus avoiding non-synchronization absolute time of the whole vehicle.

In some examples, the MPU is configured to:
obtain an unlock signal of the vehicle, and instruct the GNSS module to obtain the recommended positioning information from the network according to the unlock signal.

For example, the MPU obtains the unlock signal of the vehicle from a vehicle body controller. According to the above technical solution, when the vehicle is unlocked each time, absolute time synchronization is performed on the vehicle-mounted devices, to ensure that each controller and a domain controller use unified whole vehicle time, thus solving the problem of different time of each controller of the whole vehicle.

In some examples, the MPU is configured to:
transmit the first absolute time to the MCU via the serial port line at the moment when a change occurs to high and low levels of the pulse signal if the first absolute time is obtained.

Similarly, referring to FIG. 3, if the first absolute time is obtained, the pulse signal is transmitted to the MCU via the rigid line at the moment T3 when the level of the pulse signal is pulled up, and meanwhile, the first absolute time is transmitted to the MCU via the serial port line.

In an example, the first absolute time and the UTC parsed by the MPU are packed. The pulse signal is transmitted to the MCU via the rigid line at the moment T3 when the level of the pulse signal is pulled up, and meanwhile, the packed first absolute time and UTC are transmitted to the MCU via the serial port line.

The above technical solution may avoid excessive recommended positioning information and high transmission delay results in inaccurate absolute time calculation.

Figure 5:
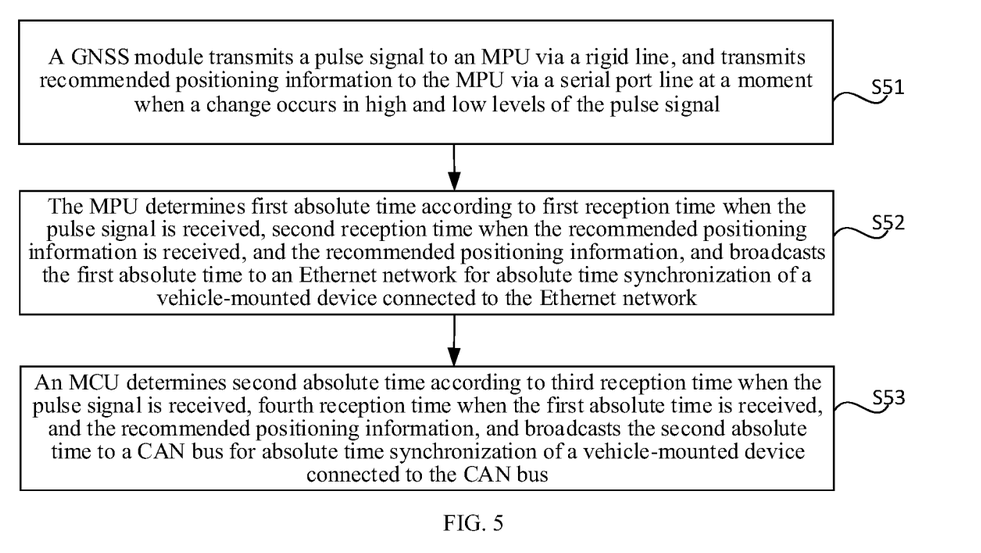
FIG. 5 is a flow chart illustrating a method for issuing absolute time of a vehicle, according to an example.

Based on the same concept, an example of the disclosure also provides a method for issuing the absolute time of a vehicle, which is applied to the vehicle-mounted controller for issuing the absolute time of the vehicle in any one of the preceding examples. Referring to FIG. 5 which shows a flow chart of the method for the absolute issuing time of the vehicle, the method includes the following steps:

in step S51, the GNSS module transmits a pulse signal to the MPU via the rigid line, and transmits recommended positioning information to the MPU via the serial port line at a moment when a change occurs in high and low levels of the pulse signal;

in step S52, the MPU determines the first absolute time according to the first reception time when the pulse signal is received, the second reception time when the recommended positioning information is received, and the recommended positioning information, and broadcasts the first absolute time to the Ethernet network for absolute time synchronization of a vehicle-mounted device connected to the Ethernet network; and in step S53, the MCU determines the second absolute time according to the third reception time when the pulse signal is received, the fourth reception time when the first absolute time is received, and the recommended positioning information, and broadcasts the second absolute time to a CAN bus for absolute time synchronization of a vehicle-mounted device connected to the CAN bus.

According to the above method, absolute time is calculated on the MPU and the microcontroller unit so that neither Ethernet nodes nor nodes on the CAN bus need to perform absolute time calculation, thus avoiding occupying resources of the Ethernet nodes and the nodes on the CAN bus. In addition, absolute time synchronization is performed on the vehicle-mounted device on the Ethernet network and the vehicle-mounted device on the CAN bus by first level (the first absolute time pertains to first-level calculation) and second level (the second absolute time pertains to a second-level calculation based on the first absolute time), respectively, thus improving the absolute time synchronization accuracy of the vehicle-mounted devices. Furthermore, by issuing absolute time via the MPU and the MCU, absolute time synchronization can be performed directly when a vehicle-mounted device is added, reducing the complexity and cost of vehicle development.

In some examples, in step S52, the MPU determines the first absolute time according to the first reception time when the pulse signal is received, the second reception time when the recommended positioning information is received, and the recommended positioning information includes:

recording, by the MPU, the first reception time when the pulse signal is received, forwarding the pulse signal to the MCU via the rigid line, recording the second reception time when the recommended positioning information is received, determining the first absolute time according to UTC carried in the recommended positioning information, the first reception time, and the second reception time, and transmitting the recommended positioning information and the first absolute time to the MCU via the serial port line.

In step S53, the MCU determines the second absolute time according to the third reception time when the pulse signal is received, the fourth reception time when the first absolute time is received, and the recommended positioning information includes:

recording the third reception time when the pulse signal is received and the fourth reception time when the first absolute time is received, and determining the second absolute time according to the UTC carried in the recommended positioning information, the third reception time, and the fourth reception time.

In some examples, before the GNSS module transmits the pulse signals to the MPU via the rigid line, the method includes: generating the pulse signal by the GNSS module in the case that the recommended positioning information is obtained, a period of the pulse signal being determined by at least one of a baud rate of the serial port line configured for the vehicle, and a data size of the recommended positioning information.

In some examples, generating the pulse signal by the GNSS module in the case that the recommended positioning information is obtained, includes:
determining, by the GNSS module, the data size of the recommended positioning information; determining a predicted duration for the serial port line to transmit the recommended positioning information according to the data size and the baud rate of the serial port line; and generating the pulse signal according to the predicted duration, the period of the pulse signal being greater than the predicted duration.

In some examples, the method includes:

obtaining, by the MPU, device absolute time reported by a plurality of vehicle-mounted devices on the Ethernet network during travel of the vehicle, and determining a maximum time difference in device absolute time corresponding to each of the vehicle-mounted devices; and instructing the GNSS module to obtain the recommended positioning information from the network in the case that the maximum time difference is greater than a preset time difference threshold.

In some examples, the method includes:

instructing the GNSS module to obtain the recommended positioning information from the network by the MCU according to a preset synchronization period during the travel of the vehicle.

In some examples, the method includes:

obtaining an unlock signal of the vehicle by the MPU, and instructing the GNSS module to obtain the recommended positioning information from the network according to the unlock signal.

In some examples, the method includes:

transmitting the first absolute time to the MCU via the serial port line at the moment when a change occurs to high and low levels of the pulse signal if the first absolute time is obtained by the MPU.

In some examples, the method includes:

obtaining the UTC by parsing the recommended positioning information via the MPU; and obtaining the first absolute time according to the first reception time, the second reception time, and the UTC.

An example of the disclosure also provides a vehicle, including the vehicle-mounted controller, for issuing the absolute time of the vehicle in any one of the foregoing examples.

It may be understood that the vehicle-mounted controller of the disclosure may be an internet-of-vehicle system.

Figure 6:
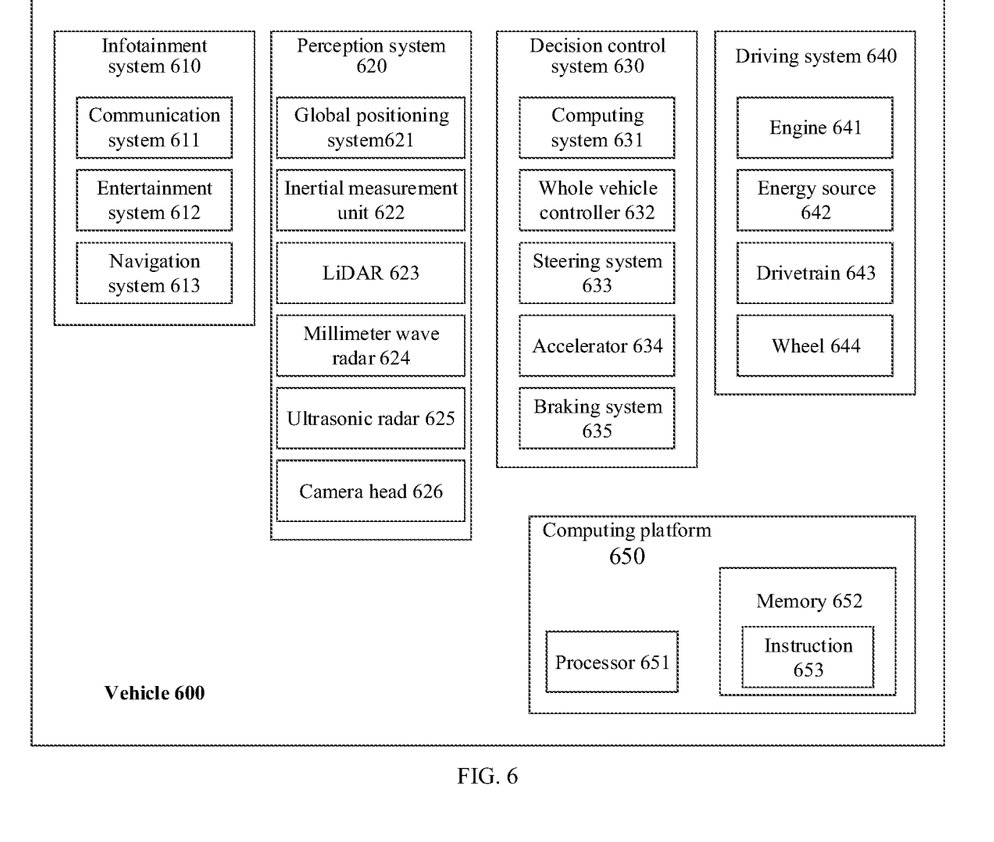
FIG. 6 is a functional block diagram illustrating a vehicle according to an example.

Referring to FIG. 6, FIG. 6 is a functional block diagram illustrating a vehicle 600 according to an example. A vehicle 600 may be configured in a fully or partially autonomous mode. For example, the vehicle 600 may acquire surrounding environment information by a perception system 620 and obtain an autonomous strategy based on an analysis of the surrounding environment information to achieve a fully autonomous function, or present the analysis results to a user to achieve a partially autonomous function.

The vehicle 600 may include various subsystems, for example, an infotainment system 610, the perception system 620, a decision control system 630, a driving system 640, and a computing platform 650. In some examples, the vehicle 600 may include more or fewer subsystems, and each subsystem may include a plurality of components. Additionally, each subsystem and component of the vehicle 600 may be interconnected in a wired or wireless manner.

In some examples, the infotainment system 610 may include a communication system 611, an entertainment system 612, and a navigation system 613.

The communication system 611 may include a wireless communication system that can wirelessly communicate with one or more devices either directly or via a communication network. For example, the wireless communication system may use 3G cellular communication, such as CDMA, EVDO, GSM/GPRS, or 4G cellular communication, such as LTE, or 5G cellular communication. The wireless communication system may utilize WiFi to communicate with a WLAN (wireless local area network). In some examples, the wireless communication system may communicate directly with a device utilizing an infrared link, Bluetooth, or ZigBee.

The entertainment system 612 may include a display device, a microphone, and a sound, and the user may listen to broadcasts, or play music within the vehicle based on the entertainment system; or a mobile phone communicates with the vehicle, to achieve screen projection of the mobile phone on a display device, and the display device may be touch-sensitive, so that the user can perform operation by touching a screen.

In some cases, a voice signal of the user may be acquired by the microphone, and based on the analysis of the voice signal of the user, so that certain controls on the vehicle 600 by the user is implemented, such as adjustment on the temperature within the vehicle. In other cases, music may be played to the user by the sound.

The navigation system 613 may include a map service provided by a map provider to provide navigation of a travel route for the vehicle 600, may be used in cooperation with a global positioning system 621 and an inertial measurement unit 622. The map service provided by the map provider may be a two-dimensional map or may be a high definition map.

The perception system 620 may include a plurality of types of sensors that sense information about the surrounding environment of the vehicle 600. For example, the perception system 620 may include a global positioning system 621 (which may be a GPS system or a BeiDou system or other positioning systems), an IMU (inertial measurement unit) 622, a LiDAR 623, a millimeter wave radar 624, an ultrasonic radar 625, and a camera head 626. The perception system 620 may also include a sensor for an internal system of the monitored vehicle 600 (for example, an in-vehicle air quality monitor, a fuel gauge, an oil temperature gauge, etc.). Sensor data from one or more of these sensors may be used to detect objects and their respective characteristics (position, shape, direction, speed, etc.). Such detection and identification is a function for safe operation of the vehicle 600.

The global positioning system 621 is configured to estimate the geographic position of the vehicle 600.

The inertial measurement unit 622 is configured to sense a change in the pose of the vehicle 600 based on inertial acceleration. In some examples, the inertial measurement unit 622 may be a combination of an accelerometer and a gyroscope.

The LiDAR 623 utilizes a laser to sense objects in the environment in which the vehicle 600 is located. In some examples, the LiDAR 623 may include one or more laser sources, laser scanners, and one or more detectors, as well as other system components.

The millimeter wave radar 624 utilizes radio signals to sense objects in the surrounding environment of the vehicle 600. In some examples, in addition to sensing the objects, the millimeter wave radar 624 may also be utilized to sense the speed and/or heading direction of the objects.

The ultrasonic radar 625 may utilize ultrasonic signals to sense objects around the vehicle 600.

The camera head 626 is configured to capture image information of the surrounding environment of the vehicle 600. The camera head 626 may include a monocular camera, a binocular camera, a structured light camera, a panoramic camera, and the like, and the image information acquired by the camera head 626 may include static images or may also include video streaming information.

The decision control system 630 includes a computing system 631 for analysis and decision-making based on the information acquired by the perception system 620, and the decision control system 630 also includes a whole vehicle controller 632 that controls a powertrain of the vehicle 600, and a steering system 633 for controlling the vehicle 600, an accelerator 634, and a braking system 635.

The computing system 631 may operate to process and analyze various information acquired by the perception system 620, in order to identify targets, objects, and/or features in the surrounding environment of the vehicle 600. The targets may include pedestrians or animals, and the objects and/or features may include traffic signals, road boundaries, and obstacles. The computing system 631 can use an object recognition algorithm, an SFM (Structure from Motion) algorithm, video tracking, or other technologies. In some examples, the computing system 631 can be configured to map an environment, track an object, estimate the speed of the object, and the like. The computing system 631 can analyze the various information acquired and obtains a control strategy for the vehicle.

The whole vehicle controller 632 may be configured to perform coordinated control on a power battery and an engine 641 of the vehicle to promote the power performance of the vehicle 600.

The steering system 633 may operate to adjust the heading direction of the vehicle 600, for example, may be a steering wheel system in an example.

The accelerator 634 is configured to control the operating speed of the engine 641, and then control the speed of the vehicle 600.

The braking system 635 is configured to control deceleration of the vehicle 600. The braking system 635 may use friction to slow down wheels 644. In some examples, the braking system 635 may convert kinetic energy of the wheels 644 to electric current. The braking system 635 may also take other forms to slow down the speed of the wheels 644 to control the speed of the vehicle 600.

The driving system 640 may include components that provide powered motion for the vehicle 600. In an example, the driving system 640 may include an engine 641, an energy source 642, a drivetrain 643, and wheels 644. The engine 641 may be an internal combustion engine, an electric motor, an air compression engine, or other types of engine combinations, such as a hybrid engine of a gasoline engine and an electric motor, a hybrid engine of an internal combustion engine and an air compression engine. The engine 641 converts the energy source 642 into mechanical energy.

The energy source 642 includes, for example, gasoline, diesel, other petroleum-based fuels, propane, other compressed gas-based fuels, ethanol, solar panels, batteries, and other electrical power sources. The energy source 642 may also provide energy for other systems of the vehicle 600.

The drivetrain 643 may transmit mechanical power from the engine 641 to the wheels 644. The drivetrain 643 may include a gearbox, a differential, and a drive axle. In an example, the drivetrain 643 may also include other devices, such as a clutch. The drive axle may include one or more axles that may be coupled to one or more wheels 644.

Some or all of the functions of the vehicle 600 are controlled by the computing platform 650. The computing platform 650 may include at least one processor 651 that may execute instructions 653 stored in a non-transitory computer readable medium such as a memory 652. In some examples, the computing platform 650 may also be a plurality of computing devices that control individual components or subsystems of the vehicle 600 in a distributed manner.

The processor 651 may be any conventional processor, such as a commercially available CPU. Alternatively, the processor 651 may also include, for example, a GPU (Graphic Process Unit), an FPGA (Field Programmable Gate Array), an SOC (System on Chip), an ASIC (Application Specific Integrated Circuit), or their combinations. Although FIG. 6 functionally illustrates a processor, a memory, and other elements of a computer in the same block, those of ordinary skill in the art may understand that the processor, computer, or memory may actually include a plurality of processors, computers, or memories that may be or may not be stored in the same physical housing. For example, the memory may be a hard disk drive or other storage media located in a housing distinct from that of the computer. Accordingly, references to the processor or the computer will be understood to include references to a collection of the processors or computers or memories that may or may not operate in parallel. Other than using a single processor to perform the steps described here, some components, such as a steering component and a deceleration component, may each have their own processor that performs the computation related to the functions specific to the component.

In an example of the disclosure, the processor 651 may execute the above method for issuing the absolute time of the vehicle.

In various aspects described here, the processor 651 may be located away from the vehicle and in wireless communication with the vehicle. In other aspects, some of the processes described here are performed on a processor disposed within the vehicle while the others are performed by a remote processor, including needed steps employing single operations.

In some examples, the memory 652 may contain instructions 653 (e.g., program logic) executable by the processor 651 to perform various functions for the vehicle 600. The memory 652 may also contain additional instructions, including instructions for transmitting data to, receiving data from, interacting with, and/or controlling one or more of the infotainment system 610, the perception system 620, the decision control system 630, and the driving system 640.

In addition to the instructions 653, the memory 652 may store data, such as road maps, route information, the location, direction and speed of the vehicle, other such vehicle data, and other information. Such information may be used by the vehicle 600 and the computing platform 650 during operation of the vehicle 600 in an autonomous mode, a semi-autonomous mode, and/or a manual mode.

The computing platform 650 may control the functions of the vehicle 600 based on inputs received from various subsystems (e.g., the driving system 640, the perception system 620, and the decision control system 630). For example, the computing platform 650 may utilize inputs from the decision control system 630 in order to control the steering system 633 to avoid obstacles detected by the perception system 620. In some examples, the computing platform 650 may operate to provide control for a plurality of aspects of the vehicle 600 and the subsystems.

In some examples, one or more of the above components may be mounted separately from or associated with the vehicle 600. For example, the memory 652 may be partially or completely separated from the vehicle 600. The above components may communicate and be coupled together in a wired and/or wireless manner.

In some examples, the above components are only an example, and in practical application, components of the above modules may be added or deleted according to practical needs. FIG. 6 cannot be understood as limitation on the examples of the disclosure.

An autonomous vehicle traveling on a road, like the above vehicle 600, may identify objects within its surroundings to determine adjustments to the current speed. The objects may be other vehicles, traffic control devices, or other types of objects. In some examples, each identified object may be considered independently, and based on respective characteristics of the objects, such as current speed, acceleration, and interval from the vehicle, may be used to determine a speed to be adjusted for the autonomous vehicle.

In some examples, the vehicle 600 or a perception and computing device associated with the vehicle 600 (e.g., the computing system 631, and the computing platform 650) may predict the behavior of the identified object based on the characteristics of the identified object and the state of the surrounding environment (e.g., traffic, rain, ice on a road, etc.). In some examples, each identified object depends on mutual behaviors so that all identified objects may also be considered to predict the behavior of a single identified object. The vehicle 600 can adjust its speed based on the predicted behavior of the identified object. In other words, the autonomous vehicle can determine which stable state the vehicle needs to adjust to (e.g., acceleration, deceleration, or stop) based on the predicted behavior of the object. In this process, other factors may also be considered to determine the speed of the vehicle 600, such as a lateral position of the vehicle 600 on the road on which the vehicle 600 travels, the curvature of the road, and the proximity of static and dynamic objects.

In addition to providing the instructions to adjust the speed of the autonomous vehicle, the computing device may also provide instructions to modify the steering angle of the vehicle 600, such that the autonomous vehicle follows a given trajectory and/or maintain safe lateral and longitudinal distances from the objects near the autonomous vehicle (e.g., vehicles in adjacent lanes on the road).

The above vehicle 600 may be various types of traveling tools, for example, a car, a truck, a motorcycle, a bus, a vessel, an airplane, a helicopter, a recreational vehicle, a train, and the like, which are specifically limited in the examples of the disclosure.

It should be understood that although terms "first," "second," "third," and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Those skilled in the art may readily think of other examples of the disclosure after consideration of the description and practice of the disclosure. The disclosure is intended to cover any variations, uses or adaptive changes of the disclosure, and these variations, uses or adaptive changes follow the general principle of the disclosure and include common general knowledge or customary technical means which is not disclosed by the disclosure. The description and the examples are illustrative, and the true scope and spirit of the disclosure are indicated by the following claims.

It is to be understood that the disclosure is not limited to the precise structure that has been described above and illustrated in the accompanying drawings, and various modifications and changes may be made without departing from the scope. The scope of the disclosure is limited only by the appended claims.

What is claimed is:

1. A vehicle-mounted controller for issuing absolute time of a vehicle, comprising:
    a Global Navigation Satellite System (GNSS) module;
    an Micro-processor Unit (MPU) connected to the GNSS module via a first rigid line and a first serial port line; and
    an Micro-controller Unit (MCU) connected to the MPU via a second rigid line and a second serial port line;
    the GNSS module configured to: transmit a pulse signal to the MPU via the first rigid line, and transmit recommended positioning information to the MPU via the first serial port line at a moment when a change occurs in high and low levels of the pulse signal;
    wherein the MPU configured to:
    determine first absolute time according to first reception time when the pulse signal is received, second reception time when the recommended positioning information is received, and the recommended positioning information,
    broadcast the first absolute time to an Ethernet network for absolute time synchronization of a first vehicle-mounted device connected to the Ethernet network; and
    wherein the MCU configured to:
    determine second absolute time according to third reception time when the pulse signal is received, fourth reception time when the first absolute time is received, and the recommended positioning information, and
    broadcast the second absolute time to a Controller Area Network (CAN) bus for the absolute time synchronization of a second vehicle-mounted device connected to the CAN bus.

2. The vehicle-mounted controller according to claim 1, wherein the MPU is configured to:
    record the first reception time when the pulse signal is received and forward the pulse signal to the MCU via the second rigid line;
    record the second reception time when the recommended positioning information is received and determine the first absolute time according to Universal Time Coordinated (UTC) carried in the recommended positioning information, the first reception time, and the second reception time; and
    transmit the recommended positioning information and the first absolute time to the MCU via the second serial port line; and the MCU is configured to:
  record the third reception time when the pulse signal is received and the fourth reception time when the first absolute time is received, and
  determine the second absolute time according to the UTC carried in the recommended positioning information, the third reception time, and the fourth reception time.

3. The vehicle-mounted controller according to claim 1, wherein the GNSS module is configured to generate the pulse signal in a case that the recommended positioning information is obtained, wherein a period of the pulse signal is determined by at least one of a baud rate of the first serial port line configured for the vehicle, and a data size of the recommended positioning information.

4. The vehicle-mounted controller according to claim 3, wherein the GNSS module is configured to:
  determine the data size of the recommended positioning information;
  determine a predicted duration for the first serial port line to transmit the recommended positioning information according to the data size and the baud rate of the first serial port line; and
  generate the pulse signal according to the predicted duration, the period of the pulse signal being greater than the predicted duration.

5. The vehicle-mounted controller according to claim 3, wherein the MPU is configured to:
  obtain device absolute time reported by a plurality of vehicle-mounted devices connected to the Ethernet network during travel of the vehicle;
  determine a maximum time difference in device absolute time corresponding to each of the vehicle-mounted devices; and
  instruct the GNSS module to obtain the recommended positioning information from a network connected to the GNSS module in a case that the maximum time difference is greater than a preset time difference threshold.

6. The vehicle-mounted controller according to claim 3, wherein the MCU is configured to:
  instruct the GNSS module to obtain the recommended positioning information from a network connected to the GNSS module according to a preset synchronization period during travel of the vehicle.

7. The vehicle-mounted controller according to claim 3, wherein the MPU is configured to:
  obtain an unlock signal of the vehicle, and instruct the GNSS module to obtain the recommended positioning information from a network connected to the GNSS module according to the unlock signal.

8. The vehicle-mounted controller according to claim 1, wherein the MPU is configured to:
  transmit the first absolute time to the MCU via the second serial port line at the moment when a change occurs to the high and the low levels of the pulse signal in a case that the first absolute time is obtained.

9. The vehicle-mounted controller according to claim 1, wherein the MPU is configured to:
  obtain Universal Time Coordinated (UTC) by parsing the recommended positioning information; and
  obtain the first absolute time according to the first reception time, the second reception time, and the UTC.

10. A method for issuing absolute time of a vehicle, and the method comprising:
  transmitting, by a Global Navigation Satellite System (GNSS) module, a pulse signal to a Micro-processor Unit (MPU) via a first rigid line, and transmitting recommended positioning information to the MPU via a first serial port line at a moment when a change occurs in high and low levels of the pulse signal;
  determining, by the MPU, first absolute time according to first reception time when the pulse signal is received, second reception time when the recommended positioning information is received, and the recommended positioning information, and broadcasting the first absolute time to an Ethernet network for absolute time synchronization of a first vehicle-mounted device connected to the Ethernet network; and
  determining, by a Micro-controller Unit (MCU), second absolute time according to third reception time when the pulse signal is received, fourth reception time when the first absolute time is received, and the recommended positioning information, and broadcasting the second absolute time to a Controller Area Network (CAN) bus for absolute time synchronization of a second vehicle-mounted device connected to the CAN bus.

11. The method according to claim 10, wherein determining, by the MPU, the first absolute time according to the first reception time when the pulse signal is received, the second reception time when the recommended positioning information is received, and the recommended positioning information, comprises:
  recording, by the MPU, the first reception time when the pulse signal is received and forwarding the pulse signal to the MCU via the first rigid line; recording the second reception time when the recommended positioning information is received and determining the first absolute time according to Universal Time Coordinated (UTC) carried in the recommended positioning information, the first reception time, and the second reception time; and transmitting the recommended positioning information and the first absolute time to the MCU via a second serial port line; and
  determining, by the MCU, the second absolute time according to the third reception time when the pulse signal is received, the fourth reception time when the first absolute time is received, and the recommended positioning information, comprises:
  recording the third reception time when the pulse signal is received and the fourth reception time when the first absolute time is received, and determining the second absolute time according to the UTC carried in the recommended positioning information, the third reception time, and the fourth reception time.

12. The method according to claim 10, further comprising:
  generating the pulse signal by the GNSS module in a case that the recommended positioning information is obtained before transmitting, by the GNSS module, the pulse signal to the MPU via the first rigid line, a period of the pulse signal being determined by at least one of a baud rate of the first serial port line configured for the vehicle, and a data size of the recommended positioning information.

13. The method according to claim 12, wherein generating the pulse signal by the GNSS module in the case that the recommended positioning information is obtained, comprises:
  determining, by the GNSS module, the data size of the recommended positioning information; determining a predicted duration for the first serial port line to transmit the recommended positioning information according to the data size and the baud rate of the first serial port line; and generating the pulse signal according to the predicted duration, the period of the pulse signal being greater than the predicted duration.

14. The method according to claim 12, further comprising:
obtaining, by the MPU, device absolute time reported by a plurality of vehicle-mounted devices on the Ethernet network during travel of the vehicle, and determining a maximum time difference in device absolute time corresponding to each of the vehicle-mounted devices; and
instructing the GNSS module to obtain the recommended positioning information from a network connected to the GNSS module in a case that the maximum time difference is greater than a preset time difference threshold.

15. The method according to claim 12, further comprising:
instructing the GNSS module to obtain the recommended positioning information from a network connected to the GNSS module by the MCU according to a preset synchronization period during travel of the vehicle.

16. The method according to claim 12, further comprising:
obtaining an unlock signal of the vehicle by the MPU, and instructing the GNSS module to obtain the recommended positioning information from a network connected to the GNSS module according to the unlock signal.

17. The method according to claim 10, further comprising:
transmitting the first absolute time to the MCU via a second serial port line at the moment when a change occurs to high and low levels of the pulse signal if the first absolute time is obtained by the MPU.

18. The method according to claim 10, further comprising:
obtaining Universal Time Coordinated (UTC) by parsing the recommended positioning information via the MPU; and
obtaining the first absolute time according to the first reception time, the second reception time, and the UTC.

19. A vehicle, comprising:
a vehicle-mounted controller for issuing the absolute time of the vehicle, wherein the vehicle-mounted controller comprises:
a Global Navigation Satellite System (GNSS) module;
an Micro-processor Unit (MPU) connected to the GNSS module via a first rigid line and a first serial port line; and
an Micro-controller Unit (MCU) connected to the MPU via a second rigid line and a second serial port line;
wherein the GNSS module configured to:
transmit a pulse signal to the MPU via the first rigid line, and
transmit recommended positioning information to the MPU via the first serial port line at a moment when a change occurs in high and low levels of the pulse signal;
wherein the MPU configured to:
determine first absolute time according to first reception time when the pulse signal is received, second reception time when the recommended positioning information is received, and the recommended positioning information, and
broadcast the first absolute time to an Ethernet network for absolute time synchronization of a first vehicle-mounted device connected to the Ethernet network; and
wherein the MCU configured to:
determine second absolute time according to third reception time when the pulse signal is received, fourth reception time when the first absolute time is received, and the recommended positioning information, and
broadcast the second absolute time to a Controller Area Network (CAN) bus for absolute time synchronization of a second vehicle-mounted device connected to the CAN bus.

* * * * *

UNITED STATES PATENT AND TRADEMARK OFFICE
CERTIFICATE OF CORRECTION

PATENT NO. : 12,276,739 B2  
APPLICATION NO. : 17/974854  
DATED : April 15, 2025  
INVENTOR(S) : Hao Chen et al.

Page 1 of 1

It is certified that error appears in the above-identified patent and that said Letters Patent is hereby corrected as shown below:

In the Specification

In Column 2, Line 64, delete "(Real-TimeClock)" and insert -- (Real-Time Clock) --, therefor.
In Column 11, Line 17, delete "SFM" and insert -- SfM --, therefor.

In the Claims

In Column 14, Lines 31, in Claim 1, delete "the GNSS module configured to:" and insert -- wherein the GNSS module is configured to: --, therefor.
In Column 14, Lines 36, and 45, in Claim 1, delete "configured to:" and insert -- is configured to: --, therefor.
In Column 18, Lines 14, 21, and 30, in Claim 19, delete "configured to:" and insert -- is configured to: --, therefor.
In Column 15, Lines 63-64, in Claim 10, delete "and the method comprising:" and insert -- the method comprising: --, therefor.

Signed and Sealed this  
Twenty-fourth Day of June, 2025

Coke Morgan Stewart  
*Acting Director of the United States Patent and Trademark Office*